Patented Jan. 23, 1923.

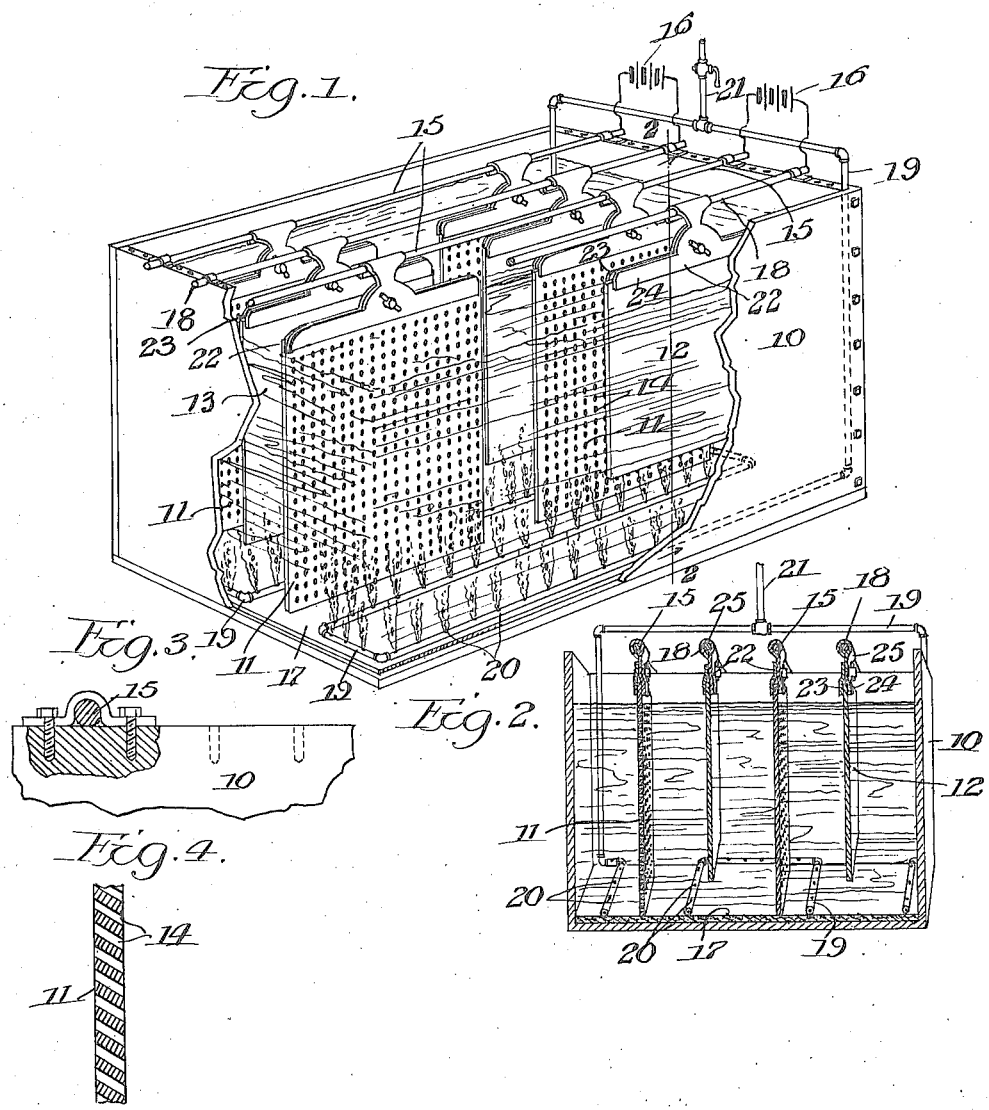

1,442,977

UNITED STATES PATENT OFFICE.

EDWARD G. SCHWUCHOW AND GEORGE F. JOHNSTONE, OF CHICAGO, ILLINOIS.

ETCHING MACHINE.

Application filed January 24, 1921. Serial No. 439,437.

*To all whom it may concern:*

Be it known that we, EDWARD G. SCHWU-CHOW and GEORGE F. JOHNSTONE, citizens of the United States, residing at Chicago, in the county of Cook and State of Illinois, have invented a certain new and useful Improvement in Etching Machines, of which the following is a full, clear, concise, and exact description, reference being had to the accompanying drawings, forming a part of this specification.

The invention relates to electrical etching machines and has among its various objects the provision of a device of this character which is extremely simple in construction and efficient in operation and in which the elements employed co-operate with each other to materially reduce the time necessary for etching the plate, yet produces an article having all the necessary qualities of an etching of high commercial value.

The invention has as an added feature the utilization of an electrode the construction of which causes the action upon the plate to be etched to be evenly distributed and simultaneously causes the removal of the material from the plate during the etching process, thereby always exposing a new surface for the electrolyte to act upon without necessitating the employment of some additional element for this purpose.

The invention also contemplates the introduction of an air current into the electrolyte so as to agitate this element and prevent the accumulation of the etched material thereon and to also prevent polarization thereof.

In addition it is an object of the invention to provide a device of this character so that the electrodes and the plates to be etched may be moved relatively to each other so that the action of the electrolyte upon the plate may be varied, to vary the time necessary to complete an etching or to accomplish some additional advantages.

The invention will be explained in conjunction with the accompanying drawings which illustrates one embodiment of the invention, it being understood, however, that the invention is not limited to the precise construction, its scope being defined by the appended claims forming a part hereof.

In the drawings—

Fig. 1 is a perspective view of one structure of which the invention is susceptible of.

Fig. 2 is a sectional view taken on line 2—2 of Fig. 1.

Fig. 3 is a detail of construction which may be resorted to.

Fig. 4 is a fragmentary portion of an electrode showing an arrangement of perforations which may be resorted to.

In the embodiment of the invention as illustrated in the drawings a tank 10 is utilized, within which are arranged one or more perforated electrodes 11 and the plates 12 to be etched, which are arranged in parallel separated relation to each other and submerged within any suitable electrolyte 13. It being understood that the surface of the plate 12 having the image is faced towards one of the electrodes and is coated with any of the resistant materials in a manner now commonly used in the process of producing what is known in the art as half tone or zinc plates.

It may be here stated, however, that the electrodes are varied depending upon the particular material to be etched. For instance, an iron electrode is utilized in combination with a copper plate to produce an etching upon said copper plate and a copper electrode is utilized in connection with a zinc plate to produce a cut thereon. And in view of the fact that the same electrolyte is used in etching both kinds of plates it is evident that one or more kinds of plates may be readily etched simultaneously. These electrodes are all provided with a plurality of apertures 14 which are preferably arranged at an incline to the plate, these plates being suspended from and in contact with, a suitable conductor 15 which is in turn connected with a suitable source of current, diagrammatically illustrated in the drawings and indicated by the numeral 16. The opposite end of all of these electrodes are in electrical contact with a conductor 17 arranged at the bottom of the tank 10. This conductor is in this particular instance a suitable piece of carbon, the use of which has been found to materially assist in reducing the time necessary in the etching of the plate. The plate to be etched is arranged in proximity to one of the electrodes 11 but in separated relation to the conductor 17, and is suspended from a conductor 18 similar to the conductor 15 and is electrically connected with the source of current supply, generally designated 16. These conductors 15 and 18 may be moved towards and away from each other so as to vary the distance between the plate and electrode, depending upon the rapidity of action or other end sought to be attained.

The apertures 14 provided in the electrodes are employed in removing the disintegrated metal from the plate being etched and to also evenly distribute the attack of the electrolyte upon the plate, so that all portions thereof will be uniformly etched.

An arrangement is also provided for preventing the polarization of these electrodes, and their becoming coated by the material in the solution or electrolyte, which might interfere with its proper operation. To eliminate this objection an arrangement is employed for agitating the electrolyte. In this instance this means consists of a number of pipes 19 having the perforations 20. These pipes are arranged in the bottom of the tank and are connected with the pipe portions 21, which are in turn connected with a suitable air pump (not shown) which pumps air through the pipe sections and through the apertures and keeps the electrolyte in motion so that the particles of material removed during the etching process cannot attach themselves and interfere with the proper operation of the device.

The plates to be etched and the electrodes are mounted or secured to the conductors, such as 15 and 18, by means of the elements 22 which are composed of two portions 23 and 24 which engage the plates and electrodes along one edge so that they may be removed therefrom and also provide a substantial contact between these elements and the plate or electrode and are provided with a hooked portion 25 which provides a means whereby the plates and the electrodes may be readily applied and removed from the conductors above mentioned, so that any one of the plates may be readily removed from the electrolyte without disturbing the other.

From the foregoing description it is evident that an arrangement or structure is provided whereby the surface to be etched is evenly attached throughout its entire surface which assists in producing a plate of high commercial value and by virtue of the fact that the electrode is in contact with the conductor arranged in the bottom of the tank the time necessary for the required etching is materially reduced and by varying the distance between these elements; that is the electrode and the plate to be etched, this time may be varied to suit any of the various requirements in the production of the etching. Furthermore by employing an arrangement for agitating the electrolyte, which in the present instance is composed of a suitable amount of salt and salamoniac, polarization is prevented which permits the same electrolyte to be employed for a longer period of time.

Having described the invention, what we claim and desire to cover by Letters Patent is:—

1. In an etching machine the combination of an electrode and an electrolyte with which the electrode is in contact, said electrode having means for evenly distributing the action of the electrolyte upon the plate to be etched.

2. In an etching machine the combination of an electrode and an electrolyte with which the electrode is in contact, said electrode being provided with a plurality of inclined apertures to distribute the action of the electrolyte upon the plate to be etched.

3. In an etching machine the combination of an electrode and an electrolyte with which the electrode is in contact, said electrode being provided with a plurality of apertures to distribute the action of the electrolyte upon the plate to be etched.

4. In an etching machine the combination of an electrode, an electrolyte and a conductor, said electrode and conductor being in contact with each other and arranged in said electrolyte and cooperating to cause the electrolyte to be directed towards a plate to be etched.

5. In an etching machine the combination of an electrode, an electrolyte and a conductor, said electrode being perforated and in contact with said conductor, and said electrode and conductor being arranged in said electrolyte.

6. In an etching machine the combination of an electrode, an electrolyte and a conductor, said electrode being provided with means cooperating to direct the action of the electrolyte towards the plate to be etched and being in contact with the conductors and the electrolyte.

7. In an etching machine the combination of an electrode and an electrolyte with which the electrode is in contact, said electrode having means for distributing the action of the electrolyte upon the plate to be etched, and means for agitating the electrolyte.

8. In an etching machine the combination of an electrode and an electrolyte with which the electrode is in contact, said electrode having a plurality of perforations for distributing the action of the electrolyte upon the plate to be etched, and means for agitating the electrolyte.

9. In an etching machine the combination of an electrode, an electrolyte, a conductor, and means for agitating the electrolyte, said conductor and electrode being in contact with each other and being arranged in the electrolyte.

10. In an etching machine the combination of a perforated electrode, an electrolyte, a conductor and means for agitating the electrode, said electrode and conductor being in contact with each other and being arranged in the electrolyte.

11. In an etching machine, the combination of an electrode, an electrolyte with which the electrode is in contact, said electrode having means for substantially evenly distributing the action of the electrolyte upon the plate to be etched, and means for supporting the plate and electrode, said means permitting the plate and electrode to be moved relatively to each other.

12. In an etching machine, the combination of an electrode, an electrolyte with which the electrode is in contact, and means for distributing the action of the electrolyte upon the plate to be etched.

13. In an etching machine, the combination of an electrode, an electrolyte with which the electrode is in contact, and perforated means for distributing the action of the electrolyte upon the plate to be etched.

14. In an etching machine the combination of an electrode an electrolyte and a conductor, said electrode and conductor being in contact with each other and means for evenly distributing the action of the electrolyte upon the plate to be etched.

15. In an etching machine the combination of an electrode, an electrolyte and a conductor, said electrode and conductor being in contact with each other and means for evenly distributing the action of the electrolyte upon the plate to be etched, and means for agitating the electrolyte.

16. In an etching machine the combination of an electrode an electrolyte and a conductor, said electrode and conductor being in contact with each other and means for evenly distributing the action of the electrolyte upon the plate to be etched, said electrode being movable to vary the distance between it and the plate to be etched.

17. In an etching machine the combination of an electrode, an electrolyte and a conductor, said electrode and conductor being in contact with each other and means for evenly distributing the action of the electrolyte upon the plate to be etched, and means for agitating the electrolyte, said electrode being movable to vary the distance between it and the plate to be etched.

18. In an etching machine the combination of an electrode, an electrolyte and a conductor, said electrode and conductor being in contact with each other and means for evenly distributing the action of the electrolyte upon the plate to be etched, and means for agitating said electrolyte said means including fluid under pressure.

19. In an etching machine the combination of a tank electrolyte provided in said tank, means for introducing fluid under pressure into said electrolyte a conductor, an electrode arranged in contact with said conductor, conductors for supporting said electrode and means whereby the action of said electrolyte is substantially evenly distributed upon the plate to be etched.

20. In an etching machine the combination of a tank electrolyte provided in said tank, means for introducing fluid under pressure into said electrolyte a conductor, an electrode arranged in contact with said conductor, conductors for supporting said electrode and means whereby the action of said electrolyte is substantially evenly distributed upon the plate to be etched, said supporting conductors being movable to vary the distance between the electrodes carried thereby and the plate to be etched.

21. In an etching machine the combination of an electrode and an electrolyte, means for causing the action of the electrolyte to be directed towards and be distributed upon a plate to be etched.

22. In an etching machine the combination of an electrode and an electrolyte and means for directing the electrolyte towards the plate to be etched.

23. In an etching machine the combination of an electrode and an electrolyte, means for agitating the electrolyte, and means for directing the electrolyte towards the plate to be etched.

24. In an etching machine the combination of an electrode and an electrolyte and means for directing the electrolyte towards the plate to be etched, and acting to cause the action of the electrolyte to be distributed upon the plate to be etched.

25. In an etching machine the combination of an electrode and an electrolyte and means for directing the electrolyte towards the plate to be etched, said means acting to cause the action of the electrolyte to be distributed upon the plate to be etched.

In witness whereof, we hereunto subscribe our names this 22nd day of January, A. D. 1921.

EDWARD G. SCHWUCHOW.
GEORGE F. JOHNSTONE.